United States Patent Office 3,597,447
Patented Aug. 3, 1971

3,597,447
PROCESS FOR PRODUCING 1-ALKYL (OR ALKE-NYL)-2-AMINOALKYLPYRROLIDINES AND INTERMEDIATES THEREFOR
Yoshio Kashihara, Osaka, Shozi Fukuzawa, Kyoto, Toshio Imamura, Osaka, Minoru Kakehi, Kobe, and Masayuki Watanabe, Aicht, Japan, assignors to Societe d'Etudes Scientifiques et Industrielles de l'Ile-de France, Paris, France
No Drawing. Filed Feb. 11, 1969, Ser. No. 798,446
Claims priority, application Japan, Feb. 16, 1968, 43/9,683
Int. Cl. C07d *27/52*
U.S. Cl. 260—326.85          5 Claims

ABSTRACT OF THE DISCLOSURE

By the process of this invention, high purity 1-alkyl (or alkenyl)-2-aminoalkylpyrrolidines are produced. Such high purity aminoalkylpyrrolidines are particularly useful in the preparation of benzamides employed in the treatment of mammals for emesis and nervous disorders. In addition, such pyrrolidines may be used in the production of pyrrolidylquinolines and pyrrolidylquinazolines useful as anti-inflammatory agents when administered to mammals.

---

This invention relates to a process for producing 1-alkyl (or alkenyl)-2-aminoalkylpyrrolidines and intermediates therefor.

In accordance with this invention, a process is provided for producing a 1-alkyl (or alkenyl)-2-aminoalkylpyrrolidine having the formula:

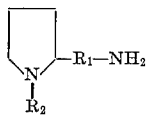

(VI)

wherein, in this Formula VI and in all other formulae described herein, $R_1$ is lower alkylene and $R_2$ is lower alkyl or lower alkenyl. The process comprises reacting a 2-haloalkyltetrahydrofuran having the formula:

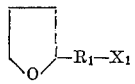

(I)

wherein, in this Formula I and in all other formulae described herein, $X_1$ is halogen, with an alkali metal salt of phthalimide to obtain an N-(2-tetrahydrofuryl)-alkylphthalimide having the formula:

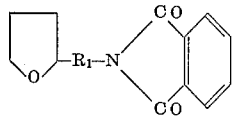

(II)

The N-(2-tetrahydrofuryl)-alkylphthalimide is reacted with a hydrogen halide or an alkali metal halide in the presence of an acid to obtain an N-dihaloalkylphthalimide having the formula:

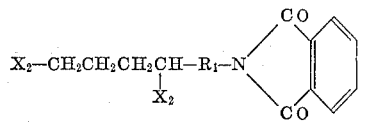

(III)

wherein, in this Formula III and in all other formulae herein described, $X_2$ is halogen.

The N-dihaloalkylphthalimide is reacted with an aliphatic amine having the formula:

$$R_2-NH_2 \quad \text{(IV)}$$

to obtain an N-[1-alkyl (or alkenyl)-2-pyrrolidinyl] alkylphthalimide having the formula:

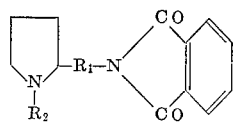

(V)

and finally hydrolyzing it to the 1-alkyl (or alkenyl)-2-aminoalkylpyrrolidine of the Formula VI.

$X_1$ and $X_2$ may be the same or different halogens such as chlorine, bromine or iodine. Preferably, $R_1$ is a lower alkylene radical having 1 to 6 carbon atoms and $R_2$ is lower alkyl having 1 to 6 carbon atoms or alkenyl radical having 1 to 6 carbon atoms. Examples of $R_1$ are methylene, ethylene, propylene, isopropylene or butylene. Examples of $R_2$ or methyl, ethyl, isopropyl, butyl, allyl, propenyl, butenyl or isobutenyl.

The 1-alkyl (or alkenyl)-2-aminoalkylpyrrolidines are useful as reactants in the production of certain substituted benzamides employed in the treatment of mammals for emesis and nervous diseases, as disclosed in U.S. Pat. No. 3,342,826, granted to Société d'Etudes Scientifiques et Industrielles de l'Ile-de-France on Sept. 19, 1967, as assignee of C. S. Miller, E. L. Engelhardt and Michel L. Thominet. Such aminoalkylpyrrolidines may also be used as reactants in the production of compounds useful as anti-inflammatory agents when administered to mammals as disclosed in British Pat. No. 956,253 of Mead Johnson & Company, complete specification published Apr. 22, 1964.

1-ethyl-2-aminoethylpyrrolidine, one of the compounds produced by the practice of this invention, has been heretofore prepared by heating 1-ethyl-3-chloropiperidine hydrochloride with ammonia (U.S. Pat. No. 3,031,452). However, according to the known method, there is produced, in addition, 1-ethyl-3-hydroxypiperidine, the isolation of which from the main product is difficult. Accordingly, the method of that patent is not suitable for preparing intermediates for pharmaceuticals which require materials of high purity.

The present invention provides a process for producing 1-alkyl (or alkenyl)-2-aminoalkylpyrrolidines (VI) in good yields and without the formation of such by-products.

The 2-haloalkyltetrahydrofurans (I), used as starting materials in the process of this invention, may be produced by the procedure of the method described in Chemical Abstracts, vol. 53, page 7163 f. (1959) for the preparation of 2-chloromethyltetrahydrofuran.

The first step of the present process comprises heating a 2-haloalkyltetrahydrofuran (I) with an alkali metal salt of phthalimide. Examples of alkali metal salts of phthalimide are potassium phthalimide and sodium phthalimide. In general, the reaction is carried out in a solvent such as xylene, dimethylformamide, toluene and dioxane, but there may be used any solvent which is inert to the reaction and can dissolve the starting material (I) and the alkali metal salt of phthalimide. The reaction temperature may be varied over a wide range, but the reaction is usually conducted by heating the reaction mixture to the neighborhood of the boiling point of the solvent.

The resulting N-(2-tetrahydrofuryl) alkylphthalimides (II) are novel and may be isolated and purified, but may be employed without purification as the starting material for preparation of N-dihaloalkylphthalimides (III). Conversion of N-(2-tetrahydrofuryl)-alkylphthalimides (II) into N-dihaloalkylphthalimides (III) is effected by reacting N-(2-tetrahydrofuryl) alkylphthalimides (II) with a hydrogen halide such as hydrogen chloride, hydrogen iodide and hydrogen bromide. The reaction may be carried out in the presence of a dehydrating agent such as phosphoric anhydride, polyphosphoric acid, sulfuric acid and methanesulfonyl chloride. Also, in place of the hydrogen halide, an alkali halide such as potassium bromide, potassium iodide or sodium bromide may be used in the presence of an acid such as sulfuric acid or concentrated phosphoric acid which reacts with the alkali halide to form the hydrogen halide. The reaction may be carried out in the absence of a solvent or in the presence of an inert solvent such as toluene or chloroform. The reaction temperature may be varied over a wide range, but the reaction is usually run by heating the reaction mixture to 130 to 150° C.

The resulting N-dihaloalkylphthalimides (III) are novel and may be isolated and purified, but may be employed without purification as the starting material for preparation of N-[1-alkyl (or alkenyl)-2-pyrrolidinyl] alkylphthalimides (V).

Conversion of N-dihaloalkylphthalimides (III) into N-[1-alkyl (or alkenyl)-2-pyrrolidinyl] alkylphthalimides (V) is effected by reacting N-dihaloalkylphthalimides (III) with an aliphatic amine (IV) such as methylamine, ethylamine, propylamine, isopropylamine, butylamine, isobutylamine and allylamine. The amine may be added in the form of an acid salt, preferably in the presence of a base. The reaction may be carried out in the presence or absence of a solvent. The solvent, if used, may be, for example, methanol, ethanol, water or other solvents inert to the reaction. The reaction temperature may be varied over a wide range, but the reaction is usually conducted with heating.

The resulting N-[1-alkyl (or alkenyl)-2-pyrrolidinyl] alkylphthalimides (V) are novel and may be isolated and purified, but may be employed without isolation for preparation of 1-alkyl (or alkenyl)-2-aminoalkylpyrrolidines (VI).

Conversion of N-[1-alkyl (or alkenyl)-2-pyrrolidinyl] alkylphthalimides (V) into 1-alkyl-2-aminoalkylpyrrolidines is effected by hydrolyzing N-[1-alkyl (or alkenyl)-2-pyrrolidinyl] alkylphthalimides (V). The hydrolysis is usually carried out in the presence of an acid or a base. Hydrochloric acid is most frequently used as the acid and sodium hydroxide as the base. The reaction temperature may be varied over a wide range, but the reaction may be usually accelerated by warming or heating the reaction mixture.

According to the usual method, the resulting 1-alkyl (or alkenyl)-2-aminoalkylpyrrolidines (VI) may be converted into salts with mineral acids such as hydrochloric acid, hydrobromic acid and sulfuric acid and with organic acids such as oxalic acid, tartaric acid, maleic acid and picric acid.

A more comprehensive understanding of this invention is obtained by reference to the following examples.

EXAMPLE I 1-ethyl-2-aminomethylpyrrolidine

Stage A: N-(2-tetrahydrofuryl)methylphthalimide.—A mixture of 90 g. of 2-chloromethyltetrahydrofuran, 152 g. of potassium phthalimide and 500 ml. of dimethylformamide is heated at 140 to 150° C. with stirring for 10 hours. The reaction mixture is cooled and filtered. The filtrate is poured into 3000 ml. of water. The crystals which form are collected by filtration, washed with water and dried to give 127 g. of N-(2-tetrahydrofuryl)methylphthalimide as crystals melting at 84 to 88° C.

Stage B: N-(2,5-diiodopentyl)phthalimide.—To a mixture of 166 g. of phosphoric anhydride, 584 g. of 85% phosphoric acid and 827 g. of potassium iodide is added 195 g. of N-(2-tetrahydrofuryl)methylphthalimide. The resulting mixture is heated at 130 to 140° C. for 3 hours. The reaction mixture is cooled, mixed with 1000 ml. of water and extracted with benzene. The benzene extract is washed with a 10% aqueous solution of sodium thiosulfate and an aqueous saturated solution of sodium chloride, dried and evaporated. The residue is crystallized from n-hexane to give 370 g. of N-(2,5-diiodopentyl)-phthalimide as crystals melting at 81 to 86° C.

Stage C: 1-ethyl-2-aminomethylpyrrolidine.—A mixture of 117 g. of N-(2,5 diisodopentyl)phthalimide and 162 g. of 70% aqueous ethylamine is heated at reflux with stirring for 6 hours. The excess of the ethylamine is removed by evaporation of the reaction mixture, and the remaining solution containing N-(1-ethyl-2-pyrrolidinyl)methylphthalimide is mixed with a 40% aqueous solution of sodium hydroxide prepared by dissolving 100 g. of sodium hydroxide in 150 ml. of water. After being heated at reflux for 20 hours, the reaction mixture is cooled and extracted with benzene. The benzene extract is dried and evaporated. The residue is distilled under reduced pressure to give 19.6 g. of 1-ethyl-2-aminomethylpyrrolidine as an oil boiling at 40 to 45° C. at 10 mm. of mercury.

EXAMPLE II 1-allyl-2-aminomethylpyrrolidine

Stages A and B are similar to those described in Example I.

Stage C: 1-allyl-2-aminomethylpyrrolidine.—A mixture of 117 g. of N-(2,5 diiodopentyl)phthalimide and 158 g. of 70% aqueous allylamine is heated at reflux with stirring for 6 hours. The excess of the allylamine is removed by evaporation of the reaction mixture, and the remaining solution containing N-(1-allyl-2-pyrrolidinyl)methylphthalimide is mixed with a 40% aqueous solution of sodium hydroxide prepared by dissolving 125 g. of sodium hydroxide in 200 ml. of water. After being heated at reflux for 20 hours, the reaction mixture is cooled and extracted with benzene. The benzene extract is dried and evaporated. The residue is distilled under reduced pressure to give 25 g. of 1-allyl-2-aminomethylpyrrolidine as an oil boiling at 95 to 97° C. at 25 mm. of mercury.

EXAMPLE III 1-propyl-2-aminomethylpyrrolidine

Stages A and B are similar to those described in Example I.

Stage C: 1-propyl-2-aminomethylpyrrolidine.—A mixture of 58 g. of N-(2,5-diiodopentyl)phthalimide and 95 g. of 70% aqueous propylamine is heated at reflux with stirring for 5 hours. The excess of the propylamine is removed by evaporation of the reaction mixture, and the remaining solution containing N-(1-propyl-2-pyrrolidinyl)methylphthalimide is mixed with a 40% aqueous solution of sodium hydroxide prepared by dissolving 50 g. of sodium hydroxide in 75 ml. of water. After being heated at reflux for 20 hours, the reaction mixture is cooled and extracted with benzene. The benzene extract is dried and evaporated. The residue is distilled under reduced pressure to give 14.5 g. of 1-propyl-2-aminomethylpyrrolidine as an oil boiling at 82 to 84° C. at 20 mm. of mercury.

EXAMPLE IV 1-isopropyl-2-aminomethylpyrrolidine

Stages A and B are similar to those described in Example I.

Stage C: 1-isopropyl-2-aminomethylpyrrolidine.—A mixture of 317 g. of N-(2,5-diiodopentyl)phthalimide and 570 g. of 70% aqueous isopropylamine is heated at reflux with stirring for 4 hours. The excess of the isopropylamine is removed by evaporation of the reaction mixture, and the remaining solution containing N-(1-isopropyl-2-pyrrolidinyl)methylphthalimide is mixed with a 40% aqueous solution of sodium hydroxide prepared by dissolving 240 g. of sodium hydroxide in 350 ml. of water. After being heated at reflux for 20 hours, the reaction mixture is cooled and extracted with benzene. The benzene extract is dried and evaporated. The residue is distilled under reduced pressure to give 28 g. of 1-isopropyl-2-aminomethylpyrrolidine as an oil boiling at 75 to 80° C. at 17 mm. of mercury.

EXAMPLE V

1-butyl-2-aminomethylpyrrolidine

Stages A and B are similar to those described in Example 1.

Stage C: 1-butyl-2-aminomethylpyrrolidine. — A mixture of 117 g. of N-(2,5-diiodopentyl)phthalimide and 200 g. of 70% aqueous butylamine is heated at reflux with stirring for 6 hours. The excess of the butylamine is removed by evaporation of the reaction mixture, and the remaining solution containing N-(1-butyl-2-pyrrolidinyl)methylphthalimide is mixed with a 40% aqueous solution of sodium hydroxide prepared by dissolving 100 g. of sodium hydroxide in 150 ml. of water. After being heated at reflux for 22 hours, the reaction mixture is cooled and extracted with benzene. The benzene extract is dried and evaporated. The residue is distilled under reduced pressure to give 20.5 g. of 1-butyl-2-aminomethylpyrrolidine as an oil boiling at 86 to 87° C. at 10 mm. of mercury.

What is claimed is:

1. The process for preparing a 1-alkyl(or alkenyl)-2-aminoalkylpyrrolidine having the formula:

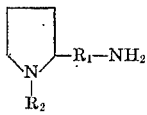

said process comprising reacting with heating an N-dihaloalkylphthalimide having the formula:

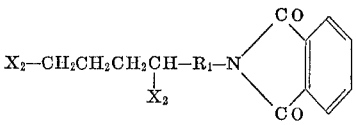

with an aliphatic amine having the formula:

$$R_2\text{---}NH_2$$

to form an N-[1-alkyl(or alkenyl)-2-pyrrolidinyl]-alkylphthalamide; and hydrolyzing in the presence of an acid or a base the resulting N-[1-alkyl(or alkenyl)-2-pyrrolidinyl]-alkylphthalimide; wherein in the formulae $X_2$ is halogen and $R_2$ is lower alkyl or lower alkenyl.

2. The process of claim 1, in which the aliphatic amine is ethylamine.

3. The process of claim 1, in which the aliphatic amine is allylamine.

4. The process of claim 1, in which the aliphatic amine is isopropylamine.

5. The process of claim 1, in which the aliphatic amine is propylamine.

References Cited

Morrison et al. Organic Chemistry, p. 686 (1959).

ALEX MAZEL, Primary Examiner

J. A. NARCAVAGE, Assistant Examiner

U.S. Cl. X.R.

260—326A, 326N, 326HL, 999